United States Patent Office 2,745,871
Patented May 15, 1956

2,745,871

ALKYLAMINE SALTS OF ALPHA-2,4,5-TRI-CHLOROPHENOXYPROPIONIC ACID

Bill M. Williams, Midland, Mich., assignor to The Dow Chemical Company, Midland, Mich., a corporation of Delaware No Drawing. Application May 16, 1951,
Serial No. 226,750

1 Claim. (Cl. 260—521)

This invention is directed to lower alkylamine salts of alpha-2,4,5-trichlorophenoxypropionic acid of the formula:

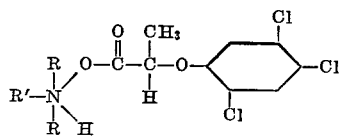

wherein R' is an alkyl group containing 1 to 4 carbon atoms, inclusive, and each R is hydrogen or an alkyl group containing 1 to 4 carbon atoms, inclusive. These new compounds are crystalline solids, soluble in water, and substantially insoluble in non-polar organic solvents. They are useful as constituents of plant growth regulant compositions.

The new compounds may be prepared by various methods. A preferred procedure comprises reacting one molecular proportion of alpha-2,4,5-trichlorophenoxypropionic acid with at least one molecular proportion of an alkyl amine of the formula:

wherein R and R' have the values as set forth above. Good results have been obtained when employing 2 to 20 moles of amine to each mole of the trichlorophenoxypropionic acid, whereby the excess amine serves as a reaction solvent. In practice the alpha-2,4,5-trichlorophenoxypropionic acid is added portionwise with agitation to the amine while the reaction mixture is maintained below the boiling point of the amine. The reaction evolves heat and cooling may be required. On completion of the reaction, any excess unreacted amine may be recovered by distillation under reduced pressure to yield the desired salt as the undistilled residue.

The alpha-2,4,5-trichlorophenoxypropionic acid, employed as a starting material as above described, may be obtained by acidifying the sodium alpha-2,4,5-trichlorophenoxypropionate salt which results from the condensation reaction of sodium alphachloropropionate with sodium 2,4,5-trichlorophenate. The acid may be purified, if desired, as by recrystallization.

The following examples illustrate the invention but are not to be construed as limiting:

Example 1

27.0 grams (0.1 mole) of alpha-2,4,5-trichlorophenoxypropionic acid (melting at 180°–181° C. and assaying 99.1 per cent titration) was added in small portions with stirring to 10.0 grams (0.22 mole) of dimethylamine contained in a small reaction vessel which had been cooled in a "Dry Ice" bath. Heat was evolved and further cooling was applied to prevent loss of amine. After all the acid had dissolved, the reaction mixture was heated on a steam bath to distill off excess unreacted amine. The crude reaction product was then heated under reduced pressure to recover any remaining excess dimethylamine and to obtain as a residue the dimethylammonium alpha-2,4,5-trichlorophenoxypropionate product. This product (31.5 grams, 100 per cent yield) was a white crystalline powder, melting at 113° to 115° C. and having a chlorine content of 33.83 per cent by weight as compared to the theoretical chlorine content for $C_{11}H_{14}Cl_3NO_3$ of 33.81 per cent.

Example 2

27.0 grams (0.1 mole) of alpha-2,4,5-trichlorophenoxypropionic acid was added portionwise with stirring to 69.5 grams (2.24 moles) of methylamine maintained in a "Dry Ice" bath. Heat was evolved as the acid dissolved. When the acid had all dissolved, the excess amine was distilled off at progressively higher temperatures up to 100° C. Finally the reaction product was warmed under reduced pressure to separate residual traces of excess methylamine and to obtain as a residue the methylammonium alpha-2,4,5-trichlorophenoxypropionate salt product. This product melted at 198°–199° C. with slight decomposition and had a chlorine content of 35.44 per cent by weight as compared to the theoretical chlorine content for $C_{10}H_{12}Cl_3NO_3$ of 35.39 per cent.

Example 3

27.0 grams (0.1 mole) of alpha-2,4,5-trichlorophenoxypropionic acid was added portionwise with stirring to 59.1 grams (1 mole) of isopropylamine cooled in an ice bath. Heat was evolved and the acid dissolved completely. On completion of the reaction, excess amine was distilled off at progressively higher temperatures up to 100° C. The final separation was carried out under reduced pressure as described in Examples 1 and 2 to obtain the isopropylammonium alpha-2,4,5-trichlorophenoxypropionate salt product, melting at 177.5°–179.5° C. and analyzing 32.40 per cent by weight of chlorine compared to a theoretical chlorine content calculated for $C_{12}H_{16}Cl_3NO_3$ of 32.37 per cent.

Example 4

In a fashion similar to Example 3, one molecular proportion of alpha-2,4,5-trichlorophenoxypropionic scid is reacted portionwise with stirring with 5 molecular proportions of diisopropylamine and excess amine is separated from the reaction mixture under reduced pressure to obtain the diisopropylammonium alpha-2,4,5-trichlorophenoxypropionate salt product as a water-soluble solid.

Example 5

Following the procedure of Example 1, one molecular proportion of alpha - 2,4,5 - trichlorophenoxypropionic acid is reacted portionwise with stirring with 3 molecular proportions of trimethylamine under refrigeration. Excess amine is separated from the reaction mixture under reduced pressure and at moderately increased temperatures to obtain the trimethylammonium alpha-2,4,5-trichlorophenoxypropionate salt product as a water-soluble solid.

Example 6

Following the procedure of Example 3, one molecular proportion of alpha-2,4,5-trichlorophenoxypropionic acid is reacted portionwise with stirring with 5 molecular proportions of sec. butylamine. On completion of the reaction, the excess amine is recovered as in the previous examples to obtain as a residue the sec. butylammonium alpha-2,4,5-trichlorophenoxypropionate salt product as a water-soluble solid.

Other amine salt products are obtained in similar fashion by reacting alpha-2,4,5-trichlorophenoxypropionic acid with one of the following amines: Diethylamine, diisobutylamine, dibutylamine, n-propylamine, isobutylamine, tributylamine and triethylamine.

I claim:

Isopropylammonium alpha-2,4,5-trichlorophenoxypropionate.

References Cited in the file of this patent

UNITED STATES PATENTS

| | | |
|---|---|---|
| 2,390,941 | Jones | Dec. 11, 1945 |
| 2,396,513 | Jones | Mar. 12, 1946 |
| 2,577,969 | Jones | Dec. 11, 1951 |

OTHER REFERENCES

Paddock: Chem. Abst. 43, 9337 (1949).
Fults et al.: Chem. Abst. 42, 1013 (1948).
Zimmerman: Ind. and Eng. Chem. 35, 596–601 (1943).